(12) United States Patent
Hayashida et al.

(10) Patent No.: US 8,296,966 B2
(45) Date of Patent: Oct. 30, 2012

(54) MICROMETER

(75) Inventors: Shuji Hayashida, Kawasaki (JP); Yuji Fujikawa, Kure (JP)

(73) Assignee: Mitutoyo Corporation, Kawasaki-shi (JP)

( * ) Notice: Subject to any disclaimer, the term of this patent is extended or adjusted under 35 U.S.C. 154(b) by 0 days.

(21) Appl. No.: 13/081,843

(22) Filed: Apr. 7, 2011

(65) Prior Publication Data

US 2011/0247231 A1 Oct. 13, 2011

(30) Foreign Application Priority Data

Apr. 8, 2010 (JP) ................................. 2010-089149

(51) Int. Cl.
*G01B 3/18* (2006.01)
(52) U.S. Cl. ............................... 33/815; 33/813; 33/831
(58) Field of Classification Search .................... 33/815, 33/813, 819, 820, 831
See application file for complete search history.

(56) References Cited

U.S. PATENT DOCUMENTS

| | | | |
|---|---|---|---|
| 6,243,965 B1 * | 6/2001 | Zanier et al. | 33/831 |
| 6,247,244 B1 * | 6/2001 | Zanier et al. | 33/819 |
| 6,463,671 B1 * | 10/2002 | Saeki | 33/815 |
| 7,013,576 B2 * | 3/2006 | Hayashida et al. | 33/813 |
| 2005/0274034 A1 * | 12/2005 | Hayashida et al. | 33/813 |
| 2006/0162178 A1 * | 7/2006 | Freidin | 33/784 |
| 2011/0061256 A1 * | 3/2011 | Hayashida et al. | 33/831 |
| 2011/0247231 A1 * | 10/2011 | Hayashida et al. | 33/815 |
| 2011/0252659 A1 * | 10/2011 | Tsuji | 33/815 |

FOREIGN PATENT DOCUMENTS

| | | |
|---|---|---|
| EP | 1099928 A1 | 5/2001 |
| GB | 936209 | 9/1963 |
| JP | 40-23426 | 8/1940 |
| JP | 41-17829 | 10/1941 |
| JP | 47-1166 | 8/1972 |
| JP | 47-27857 | 11/1972 |
| JP | 56-35761 | 8/1981 |
| JP | 59-112202 | 6/1984 |
| JP | 61-026803 | 2/1986 |
| JP | 5-57602 | 7/1993 |
| JP | 2001-141402 | 5/2001 |
| JP | 2008-514904 | 5/2008 |

* cited by examiner

*Primary Examiner* — Yaritza Guadalupe-McCall
(74) *Attorney, Agent, or Firm* — Rankin, Hill & Clark LLP

(57) ABSTRACT

A micrometer includes: a body; a fixed sleeve that is fixed to the body; a spindle that is screwed to the fixed sleeve; a thimble that is rotatably fitted to an outer circumference of the fixed sleeve and has an outer end connected to the spindle; an operation sleeve fitted over a range from an outer circumference of the thimble to an outer end of the spindle and being rotatable relative to the thimble; and a constant pressure mechanism that is disposed between the operation sleeve and the spindle, the constant pressure mechanism transmitting a rotation of the operation sleeve to the spindle and allowing a free rotation of the operation sleeve against the spindle when a predetermined or more amount of load is applied on the spindle. Ball bearings are disposed between the thimble and the operation sleeve.

3 Claims, 4 Drawing Sheets

MICROMETER

The entire disclosure of Japanese Patent Application No. 2010-089149 filed Apr. 8, 2010 is expressly incorporated by reference herein.

BACKGROUND OF THE INVENTION

1. Field of the Invention

The present invention relates to a micrometer for measuring a dimension of an object to be measured based on an axial displacement of a spindle.

2. Description of Related Art

A known micrometer for measuring a dimension of an object to be measured based on an axial displacement of a spindle is provided with a constant pressure mechanism easily operable by one hand (see Patent Literature 1: JP-A-2001-141402).

The micrometer includes: a body; a fixed sleeve that is fixed to the body; a spindle that is screwed to the fixed sleeve and is axially advanced and retracted; a thimble that is rotatably attached to an outer circumference of the fixed sleeve and has an outer end connected to an outer end of the spindle; an operation sleeve fitted over a range from an outer circumference of the thimble and the outer end of the spindle; and a constant pressure mechanism that is disposed between the outer end of the operation sleeve and the outer end of the spindle and allows a free rotation of the operation sleeve against the spindle when a predetermined or more amount of load is applied on the spindle.

For operating such a micrometer by one hand, while the body being held by one hand (with middle finger, fourth finger and fifth finger), the operation sleeve is operated by a thumb and an index finger. Then, the rotation of the operation sleeve is transmitted to the spindle through the constant pressure mechanism to advance the spindle. Since the constant pressure mechanism is operated to allow the operation sleeve to freely rotate when a tip end of the spindle is contacted with the object to apply a predetermined or more amount of load on the spindle, the object is measured with a measurement force at an approximately constant level.

However, in order to facilitate a one-hand operation, the above-described micrometer is arranged such that the operation sleeve is in a surface contact with the thimble to be rotated around the thimble.

On account of such an arrangement, when the operation sleeve is rotated, in addition to the measurement force generated in the constant pressure mechanism, a rotation force generated by frictional resistance between the operation sleeve and the thimble is transmitted to the spindle through the thimble. Particularly when the operation sleeve is rotated by one-hand operation, a force inclined relative to an axis of the operation sleeve is easily applied. Accordingly, the frictional resistance between the operation sleeve and the thimble is increased and the rotation force generated by the frictional resistance is easily transmitted to the spindle through the thimble. Consequently, the measurement force fluctuates, resulting in fluctuation of measurement values.

SUMMARY OF THE INVENTION

An object of the invention is to provide a micrometer capable of eliminating factors that cause fluctuation of measurement values to improve in repeatability.

A micrometer according to an aspect of the invention includes: a body; a fixed sleeve that is fixed to the body; a spindle that is screwed into the fixed sleeve and is axially advanced and retracted; a thimble that is rotatably fitted to an outer circumference of the fixed sleeve and has an outer end connected to the spindle; an operation sleeve fitted over a range from an outer circumference of the thimble to an outer end of the spindle and being rotatable relative to the thimble; and a constant pressure mechanism that is disposed between the operation sleeve and the spindle, the constant pressure mechanism transmitting a rotation of the operation sleeve to the spindle and allowing a free rotation of the operation sleeve against the spindle when a predetermined or more amount of load is applied on the spindle, in which a friction reducing member is disposed between the thimble and the operation sleeve.

According to the aspect of the invention, when the operation sleeve is rotated, the rotation of the operation sleeve is transmitted to the constant pressure mechanism. When the loads applied on the spindle is less than a predetermined level, the rotation of the operation sleeve is transmitted to the spindle through the constant pressure mechanism. Since the spindle is screwed to the fixed sleeve, the spindle is axially advanced and retracted.

When the spindle is contacted with the object by the advancement of the spindle, a predetermined or more amount of load is applied on the spindle. Then, the rotation of the operation sleeve is not transmitted to the spindle by the constant pressure mechanism. In other words, the operation sleeve freely rotates. Thus, the object can be measured with a constant measurement force.

In the above aspect of the invention, since the friction reducing member is disposed between the thimble and the operation sleeve, frictional resistance between the operation sleeve and the thimble is reduced. Accordingly, since the rotation force generated by the frictional resistance between the operation sleeve and the thimble can be restrained, the measurement can be performed with a stable measurement force. Consequently, factors to cause fluctuation of measurement values can be eliminated to improve in repeatability.

In the micrometer according to the aspect of the invention, it is preferable that the operation sleeve includes: a first operation section fitted to the outer circumference of the thimble; and a second operation section connected to the outer end of the first operation section and having a smaller diameter than that of the thimble, and the friction reducing member is disposed between the outer circumference of the thimble and the first operation section.

With this arrangement, since the operation sleeve includes the first operation section fitted to the outer circumference of the thimble and the second operation section connected to the outer end of the first operation section and having a smaller diameter than the diameter of the thimble, the first operation section can be rotated by a thumb and an index finger of one hand holding the body. Accordingly, the measurement can be performed by one hand.

Further, since the friction reducing member is disposed between the first operation section and the thimble, in other words, since the friction reducing member is disposed on a large-diameter portion of the operation sleeve 40 where a rotation speed becomes slow, the rotation speed of the operation sleeve can be stabilized. Accordingly, such fluctuation of rotation speeds can be restrained, so that the measurement can be performed with a stable measurement force.

In the micrometer according to the aspect of the invention, it is preferable that the friction reducing member is provided by a rolling bearing.

With this arrangement, even when an inclined force is applied on the operation sleeve, the operation sleeve can be smoothly rotated against the thimble by the rolling bearings.

In the micrometer according to the aspect of the invention, the rolling bearing is provided with ball bearings disposed in at least two positions located apart in an axial direction of the spindle.

With this arrangement, since the ball bearings are disposed at two or more positions apart in the axial direction of the spindle, the operation sleeve can be prevented from being rotated in an inclined manner, so that the measurement can be performed with a stable measurement force. Furthermore, by using the ball bearings, the micrometer can be arranged with a simple structure at a relatively low cost.

DETAILED DESCRIPTION OF PREFERRED EMBODIMENT(S)

First Exemplary Embodiment

A first exemplary embodiment will be described below with reference to FIGS. 1 to 3. Herein, a digital display micrometer is exemplarily described.

Figure 1:
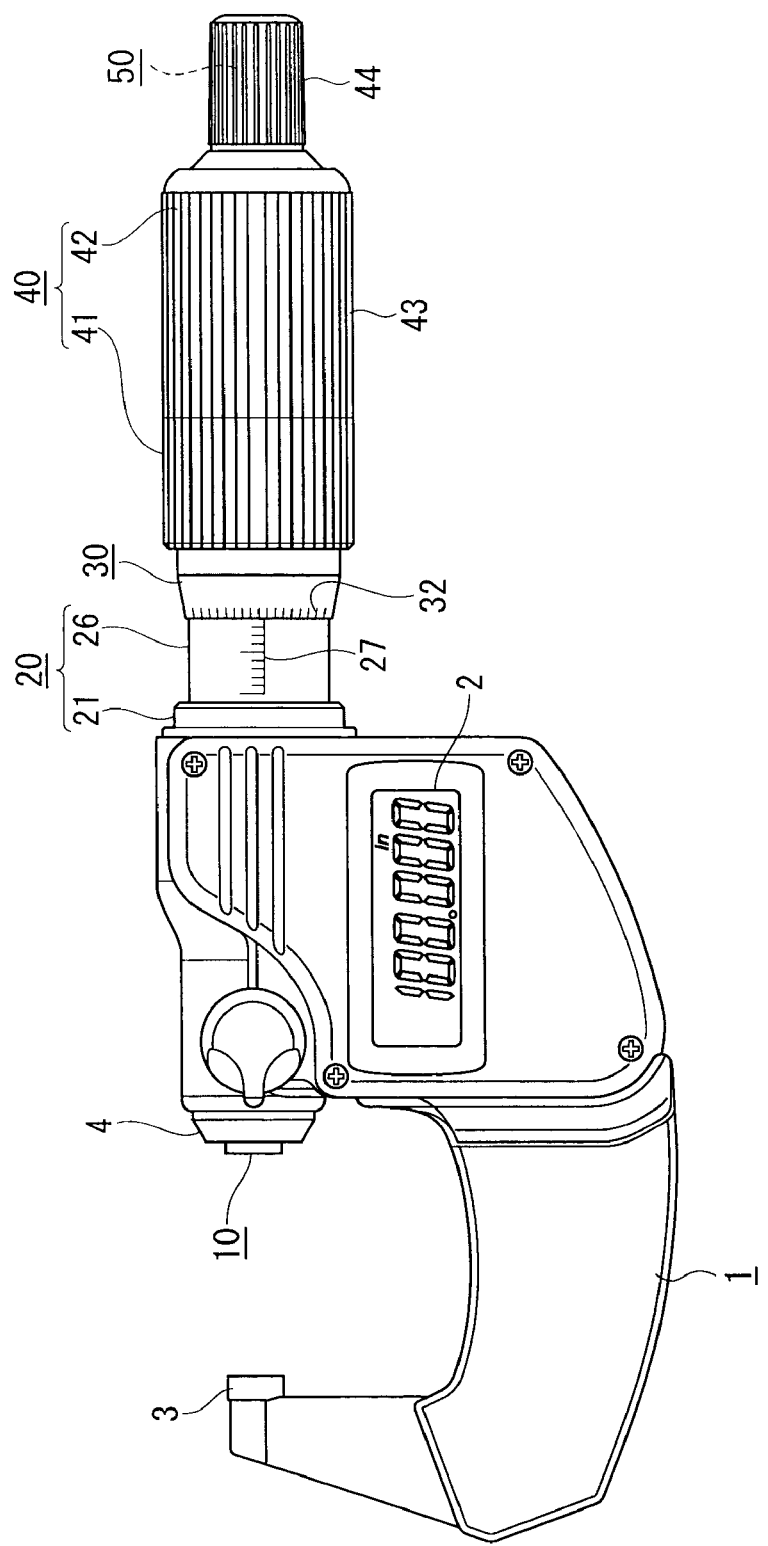
FIG. 1 shows a front view of a micrometer according to a first exemplary embodiment of the invention.

As shown in FIG. 1, the digital display micrometer includes: a body 1 in a substantially U shape; a fixed sleeve 20 that is fixed to the body 1; a spindle 10 that is screwed to the fixed sleeve 20 and is axially advanced and retracted; a thimble 30 that is rotatably attached to an outer circumference of the fixed sleeve 20 and has an outer end (middle-right side in FIG. 1) connected to the spindle 10; an operation sleeve 40 fitted over a range from an outer circumference of the thimble 30 to an outer end of the spindle and being rotatable relative to the thimble 30; and a constant pressure mechanism 50 that is disposed between the operation sleeve 40 and the spindle 10, the constant pressure mechanism 50 transmitting a rotation of the operation sleeve 40 to the spindle 10, and allowing a free rotation of the operation sleeve 40 against the spindle 10 when a predetermined or more amount of load is applied on the spindle 10.

An anvil 3 is fixed to a first end of the body 1. A bearing cylinder 4 for supporting the spindle 10 so that the spindle 10 is slidable is provided on a second end of the body 1. An encoder (not shown) for detecting a displacement of the spindle 10 is provided inside the second end of the body 1. A digital display 2 for displaying the displacement (measurement value) of the spindle 10 detected by the encoder is provided on a front side of the body 1.

Figure 2:
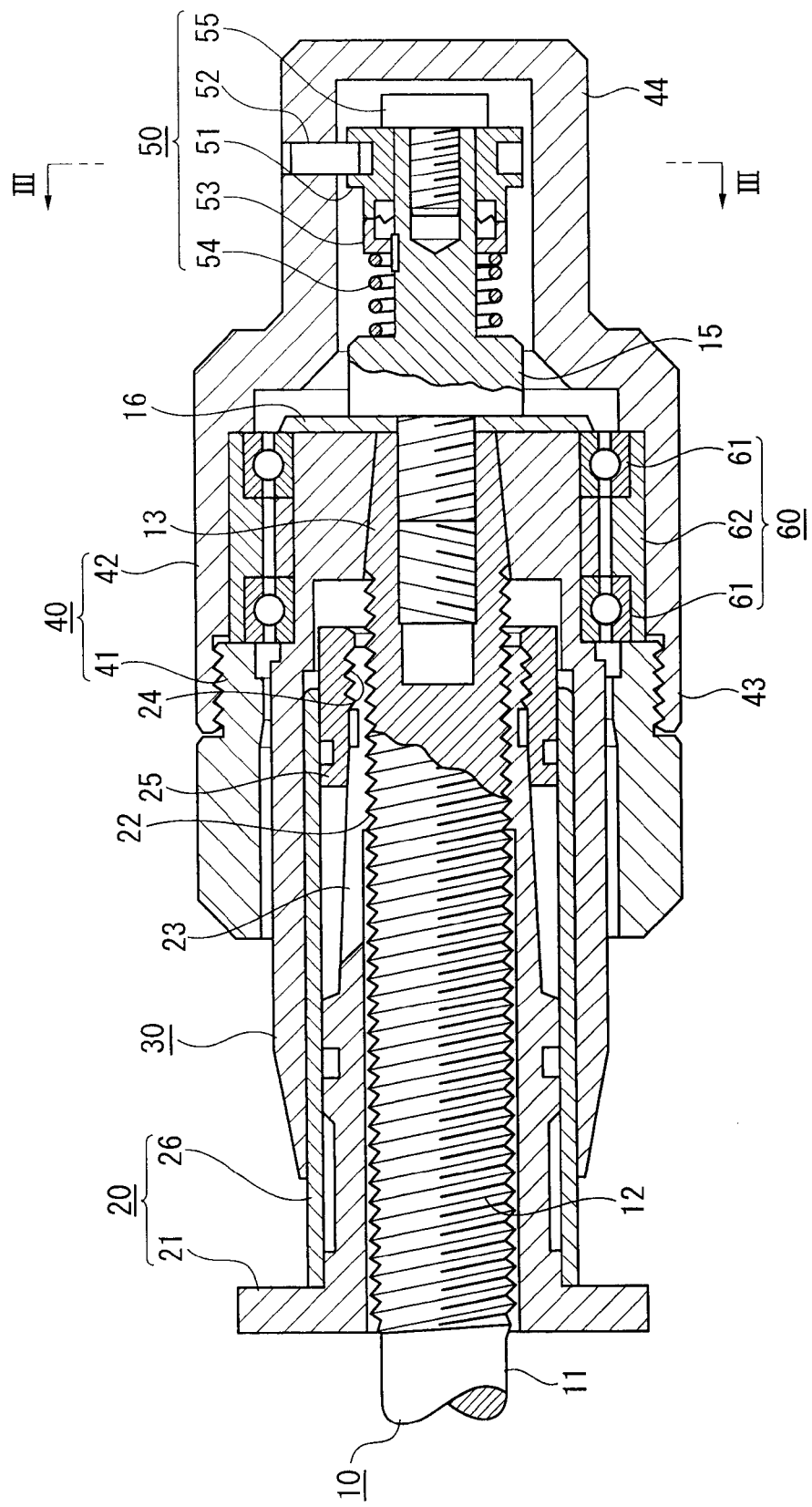
FIG. 2 shows a partial cross section of the above exemplary embodiment.
Figure 3:
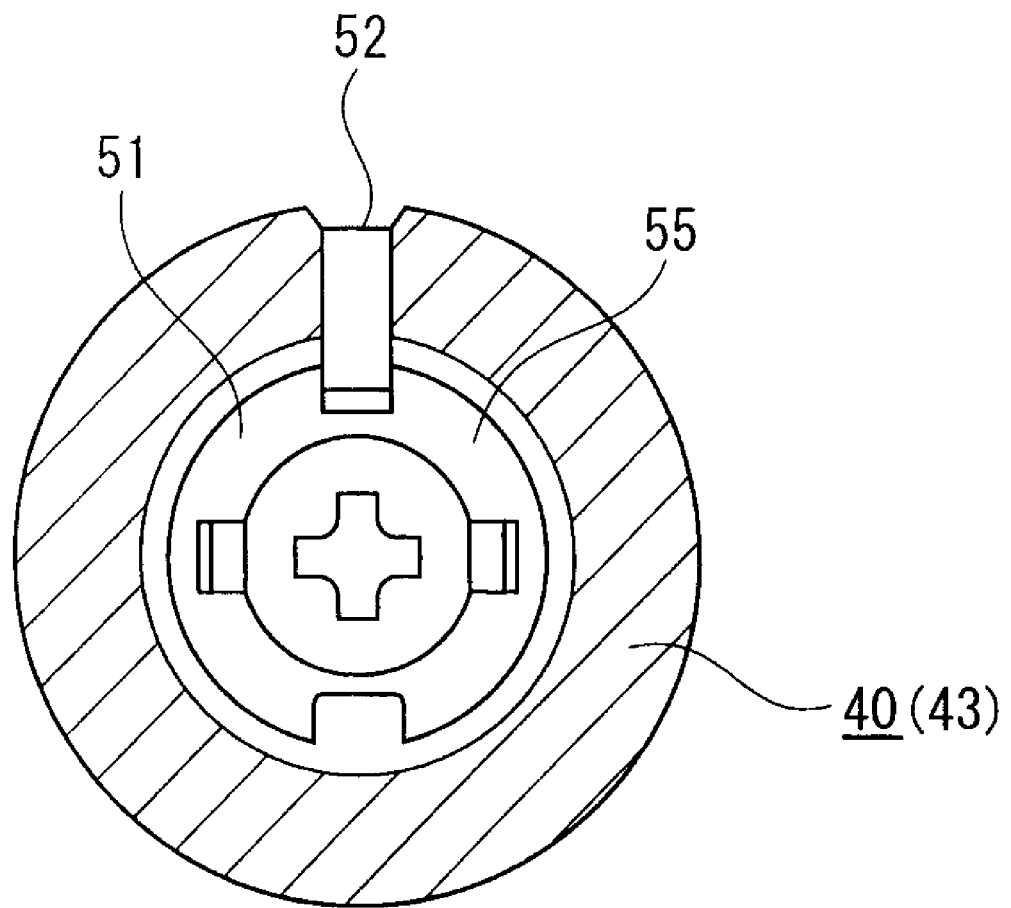
FIG. 3 shows a cross section taken along III-III line of FIG. 2.

The spindle 10 has an inner end inserted to and supported by the bearing cylinder 4 and the outer end that is screwed to and supported by the fixed sleeve 20, as shown in FIG. 2. The spindle 10 includes: a round-bar shaft 11 formed on the inner end of the spindle 10; a male screw 12 integrally formed with an outer end of the shaft 11; and a tapered portion 13 formed on an outer end of the male screw 12. These components may be formed of a single cylinder member or, alternatively, formed of separate members.

As shown in FIG. 2, the fixed sleeve 20 includes: a cylindrical inner sleeve 21 that covers an outer circumference of the male screw 12 of the spindle 10; and a cylindrical outer sleeve 26 that is fixed on an outer circumference of the inner sleeve 21.

The inner sleeve 21 includes: a female screw 22 that is screwed to the male screw 12 of the spindle 10 and is formed over a predetermined distance on an inner circumference of the inner sleeve 21 near the outer end thereof; a plurality of slits 23 that axially extend on a tapered surface of the outer circumference of the inner sleeve 21 near the outer end thereof; and a male screw 24. A nut member 25 for adjusting a screwing state (i.e., clearance) between the male screw 12 of the spindle 10 and the female screw 22 of the inner sleeve 21 is screwed to the male screw 24.

The outer sleeve 26 is formed in a length to extend from the inner end of the inner sleeve 21 to the male screw 24. A main scale 27 with a 1.0-mm pitch is formed on the outer circumference of the outer sleeve 26 in an axial direction thereof (see FIG. 1).

As shown in FIG. 2, the outer end of the thimble 30 is integrally jointed to the tapered portion 13 of the spindle 10 through a shaft member 15 and a retainer plate 16 that are screwed to the tapered portion 13 of the spindle 10. A vernier scale 32 is circumferentially formed at a predetermined pitch on the outer circumference of the thimble 30 near the inner end thereof (see FIG. 1).

The vernier scale 32 is formed at such an interval as provided by dividing the outer circumference of the thimble 30 into 100 equal parts.

As shown in FIG. 2, the operation sleeve 40 includes: a front sleeve 41 fitted to the outer circumference of the thimble 30; and a rear sleeve 42 screwed and connected with an outer end of the front sleeve 41 and covering the outer circumference of the constant pressure mechanism 50. This arrangement provides a first operation section 43 covering the outer circumference of the thimble 30 and a second operation section 44 covering the constant pressure mechanism 50 with a smaller diameter than an outer diameter of the thimble 30.

As shown in FIG. 2, the constant pressure mechanism 50 includes: a first ratchet wheel 51 rotatably attached to the shaft member 15 through a bolt 55 and having sawteeth along an outer circumference of an inner end surface; a transmission pin 52 that is provided between the first ratchet wheel 51 and the rear sleeve 42 of the operation sleeve 40 and transmits the rotation of the operation sleeve 40 to the first ratchet wheel 51 (see FIG. 3); a second ratchet wheel 53 that is unrotatable against the shaft member 15 and is axially movable and has sawteeth to be meshed with the first ratchet wheel 51; and a coil spring 54 that biases the second ratchet wheel 53 toward the first ratchet wheel 51.

In the exemplary embodiment, a friction reducing member 60 is disposed between an outer circumference of the thimble 30 and an inner circumference of the rear sleeve 42 of the operation sleeve 40.

The friction reducing member 60 includes: two ball bearings 61 (rolling bearing) disposed at two positions apart from each other in the axial direction of the spindle 10 and between the outer circumference of the thimble 30 and the inner circumference of the rear sleeve 42 of the operation sleeve 40; and a bearing holder 62 for holding the two ball bearings 61 apart.

With this arrangement, when the operation sleeve 40 is rotated, the rotation of the operation sleeve 40 is transmitted to the constant pressure mechanism 50. When the loads applied on the spindle 10 is less than a predetermined level, the rotation of the operation sleeve 40 is transmitted to the spindle 10 through the constant pressure mechanism 50.

Since the spindle 10 is screwed to the female screw 22 of the inner sleeve 21, the spindle 10 is axially advanced and retracted.

When the spindle 10 is contacted with the object by advancement of the spindle 10, a predetermined or more amount of load is applied on the spindle 10. Then, the operation sleeve 40 freely rotates by the constant pressure mechanism 50. In other words, under the conditions that a predetermined or more amount of load is applied on the spindle 10, when the operation sleeve 40 is further rotated, the second ratchet wheel 53 is moved away from the first ratchet wheel 51 against the coil spring 54 since the second ratchet wheel 53 is difficult to be rotated. Accordingly, the rotation force of the first ratchet wheel 51 is not transmitted to the second ratchet wheel 53 and the operation sleeve 40 freely rotates to keep a constant pressure.

Thus, the object can be measured with the measurement force at a constant level. After detected by the encoder (not shown), the rotation of the spindle 10 is converted into the axial displacement of the spindle 10 and is displayed on the digital display 2. Accordingly, by reading a display value on the digital display 2, a dimension of the object can be measured. Alternatively, the dimension thereof can also be read from the main scale 27 and the vernier scale 32.

In the first exemplary embodiment, since the operation sleeve 40 is rotatably held on the outer circumference of the thimble 30 through the ball bearings 61, frictional resistance between the operation sleeve 40 and the thimble 30 is reduced. Accordingly, for rotating the operation sleeve 40 to advance the spindle 10, even when a force inclined relative to the operation sleeve 40 is applied, the rotation force generated by the frictional resistance between the operation sleeve 40 and the thimble 30 can be reduced, whereby the measurement is performed with a stable measurement force. Consequently, factors to cause fluctuation of measurement values can be eliminated to improve in repeatability.

Particularly, since two ball bearings 61 are disposed at two positions apart from each other in an axial direction of the spindle 10 and between the outer circumference of the thimble 30 and the inner circumference of the rear sleeve 42 of the operation sleeve 40, the operation sleeve 40 can be prevented from being inclined relative to an axis of the spindle 10. Since the operation sleeve 40 can be prevented from being rotated in an inclined manner, the measurement can be performed with a stable measurement force.

In addition, since the bearing holder 62 for holding the two ball bearings 61 apart is provided, the inclination of the operation sleeve 40 can be effectively restrained.

Further, since the operation sleeve 40 includes the first operation section 43 fitted to the outer circumference of the thimble 30 and the second operation section 44 having a smaller diameter than the diameter of the thimble 30, the first operation section 43 can be rotated by a thumb and an index finger of one hand holding the body 1. Accordingly, the measurement can be performed by one hand.

Furthermore, since the ball bearings 61 are disposed between the first operation section 43 and the outer circumference of the thimble 30, in other words, since the ball bearings 61 are disposed at a large-diameter portion in the operation sleeve 40 where a rotation speed becomes slow, the rotation speed of the operation sleeve 40 can be stabilized. Also with this arrangement, the measurement can be performed with a stable measurement force.

Second Exemplary Embodiment

Figure 4:
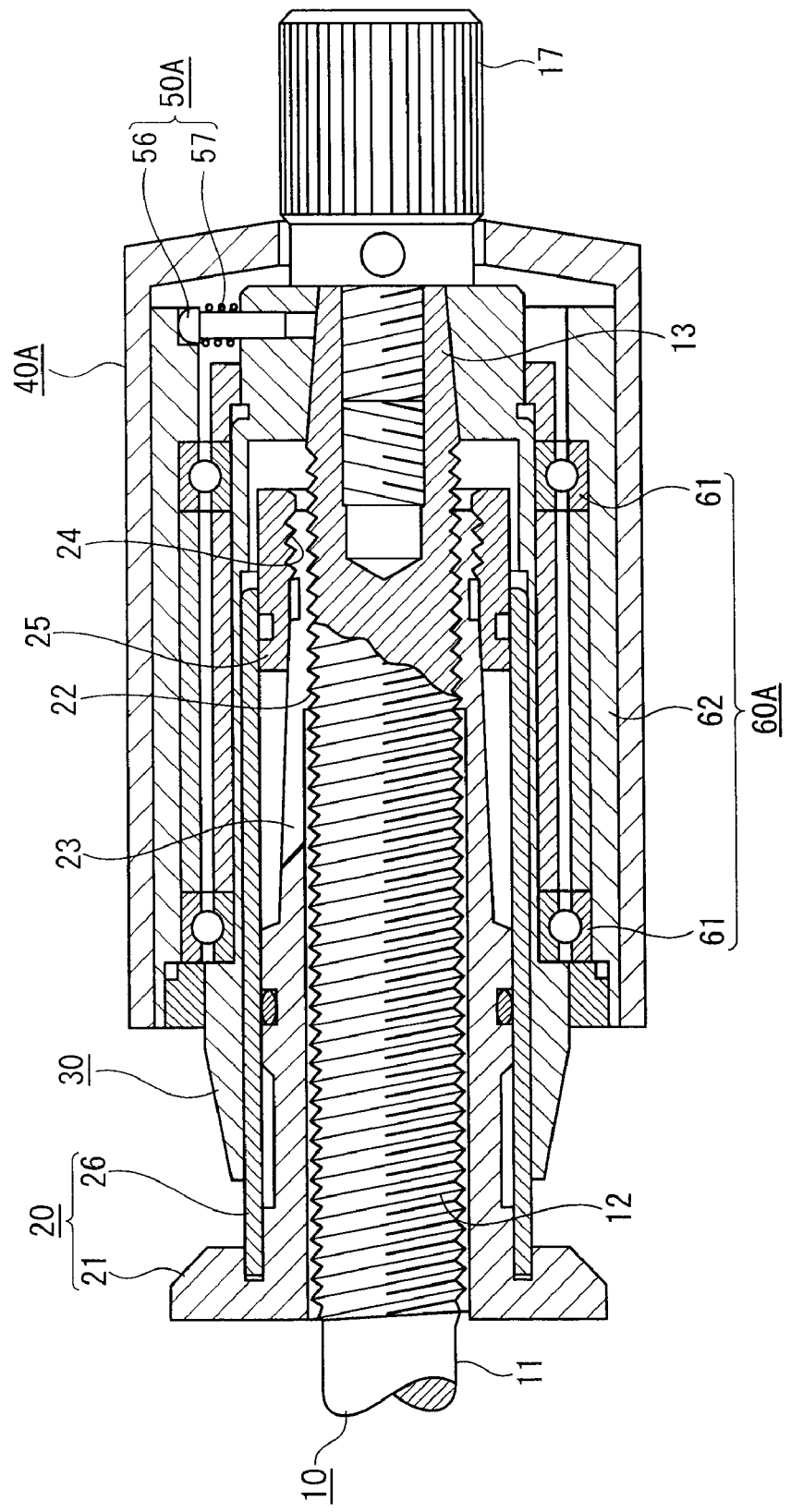
FIG. 4 shows a partial cross section of a micrometer according to a second exemplary embodiment of the invention.

A second exemplary embodiment will be described below with reference to FIG. 4. In the description of FIG. 4, the same component as in the first exemplary embodiment will be denoted by the same numeral, description of which will be omitted.

The second exemplary embodiment is different from the first exemplary embodiment in the following points.

(a) In the first exemplary embodiment, the operation sleeve 40 is configurated to cover the thimble 30 and the constant pressure mechanism 50. However, in the second exemplary embodiment, an operation sleeve 40A is formed in a length to cover the thimble 30.

(b) In the first exemplary embodiment, the friction reducing member 60 is disposed in the middle of the operation sleeve 40. However, in the second exemplary embodiment, a friction reducing member 60A is formed in a length to extend toward both ends of the operation sleeve 40A.

(c) In the first exemplary embodiment, the constant pressure mechanism 50 is disposed between the operation sleeve 40 and the spindle 10. However, in the second exemplary embodiment, a constant pressure mechanism 50A is disposed between the operation sleeve 40A and the thimble 30.

Specifically, the operation sleeve 40A is a cylinder covering the outer circumference of the thimble 30. A rear end of the operation sleeve 40A is formed in a tapered cylinder having a reduced diameter toward a rear end of the spindle 10. Accordingly, the outer end of the spindle 10 is exposed out of the operation sleeve 40A, with which an operation knob 17 having a diameter larger than that of the spindle 10 and smaller than that of the outer sleeve 26 is integrally formed. Since the operation knob 17 has a small diameter, the spindle 10 can be quickly rotated on operating the spindle 10 by fingers.

The friction reducing member 60A includes: two ball bearings 61 (rolling bearing) disposed at two positions apart from each other in an axial direction of the spindle 10, i.e., at both ends of the operation sleeve 40A, and between the outer circumference of the thimble 30 and the inner circumference of the rear sleeve 42 of the operation sleeve 40; and a bearing holder 62 for holding the two ball bearings 61 apart.

The constant pressure mechanism 50A includes: a slide pin 56 provided at the rear end of the thimble 30 in such a manner as to be perpendicular to the axis of the spindle 10 and slidable in the axial direction thereof; and a coil spring (biasing means) 57 for biasing a tip end of the slide pin 56 toward an inner surface of the bearing holder 62.

With this arrangement, when the operation sleeve 40A is rotated, rotation of the operation sleeve 40 is transmitted to the constant pressure mechanism 50A. When the loads applied on the spindle 10 is less than a predetermined level, the rotation of the operation sleeve 40A is transmitted to the spindle 10 through the constant pressure mechanism 50A. Since the spindle 10 is screwed to the female screw 22 of the inner sleeve 21, the spindle 10 is axially advanced and retracted.

When the spindle 10 is contacted with the object by advancement of the spindle 10, a predetermined or more amount of load is applied on the spindle 10. Then, the operation sleeve 40A freely rotates by the constant pressure mechanism 50A. In other words, under the conditions that a predetermined or more amount of load is applied on the spindle 10, when the operation sleeve 40A is further rotated, the bearing holder 62 is rotated while sliding against the tip end of the slide pin 56. Accordingly, the rotation force of the operation sleeve 40A is not transmitted to the thimble 30 and the spindle 10 and the operation sleeve 40A freely rotates to keep a constant pressure. Thus, the measurement can be performed at a predetermined measurement pressure.

Even in the second exemplary embodiment, since the operation sleeve 40A is rotatably held on the outer circumference of the thimble 30 through the ball bearings 61, frictional resistance between the operation sleeve 40A and the thimble 30 is reduced. Since the rotation force generated by the frictional resistance between the operation sleeve 40A and the thimble 30 can be restrained, the measurement can be performed with a stable measurement force. Consequently, factors to cause fluctuation of measurement values can be eliminated to improve in repeatability.

Particularly, in the second exemplary embodiment, since the two ball bearings 61 are disposed apart in the axial direction of the spindle 10 and are located at the both ends of the operation sleeve 40A, even when a force inclined relative to the operation sleeve 40A is applied, the operation sleeve 40A can be rotated without inclination. Accordingly, the measurement can be performed with a stable measurement force.

Modification

The invention is not limited to the above exemplary embodiments, but includes modifications and improvements as long as an object of the present invention can be achieved.

In the above exemplary embodiments, the friction reducing member 60 is provided with the ball bearings 61, but the arrangement thereof is not limited thereto. For instance, the friction reducing member 60 may be provided with a needle bearing or a bearing member in which a lot of balls are rotatably buried on an outer circumference of a cylindrical holding member.

The arrangements of the constant pressure mechanisms 50 and 50A is not limited to those described in the above exemplary embodiments. As long as the operation sleeve freely rotates against the spindle when a predetermined or more amount of load is applied on the spindle 10, any arrangement may be used.

In the above exemplary embodiments, the fixed sleeve 20 is provided by two members, i.e., the inner sleeve 21 and the outer sleeve 26, however, the two members may be integrally formed.

In the above exemplary embodiment, the digital display micrometer is exemplified, however, the invention is not limited thereto. For instance, the invention may be applied to an analog micrometer without an encoder and a digital display.

What is claimed is:

1. A micrometer comprising:
 a body;
 a fixed sleeve that is fixed to the body;
 a spindle that is screwed to the fixed sleeve and is axially advanced and retracted;
 a thimble that is rotatably fitted to an outer circumference of the fixed sleeve and has an outer end connected to the spindle;
 an operation sleeve fitted over a range from an outer circumference of the thimble to an outer end of the spindle and being rotatable relative to the thimble; and
 a constant pressure mechanism that is disposed between the operation sleeve and the spindle, the constant pressure mechanism transmitting a rotation of the operation sleeve to the spindle and allowing a free rotation of the operation sleeve against the spindle when a predetermined or more amount of load is applied on the spindle, wherein
 a bearing member is disposed between the thimble and the operation sleeve, and the bearing member is provided by a rolling bearing.

2. The micrometer according to claim 1, wherein
the operation sleeve comprises: a first operation section fitted to the outer circumference of the thimble; and a second operation section connected to an outer end of the first operation section and having a smaller diameter than that of the thimble, and
the bearing member is disposed between the outer circumference of the thimble and the first operation section.

3. The micrometer according to claim 1, wherein
the rolling bearing is provided with ball bearings disposed in at least two positions located apart in an axial direction of the spindle.

* * * * *